(12) United States Patent
Jie et al.

(10) Patent No.: US 6,587,178 B2
(45) Date of Patent: *Jul. 1, 2003

(54) DEVICE STRUCTURE THAT COMBINES INSULATING MATERIALS FOR ALIGNMENT POSTS AND OPTICAL INTERFERENCE LAYERS

(75) Inventors: Su Yong Jie, Singapore (SG); Ravi Sankar Yalamanchi, Singapore (SG); Han Zhi Gang, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,226

(22) Filed: Oct. 16, 2001

(65) Prior Publication Data

US 2002/0047967 A1 Apr. 25, 2002

Related U.S. Application Data

(62) Division of application No. 09/262,910, filed on Mar. 5, 1999, now Pat. No. 6,498,635.

(51) Int. Cl.$^7$ ............................................. G02F 1/1333
(52) U.S. Cl. ....................................... 349/155; 349/114
(58) Field of Search ................................. 349/113, 114, 349/137, 138, 155, 156

(56) References Cited

U.S. PATENT DOCUMENTS

| | | | |
|---|---|---|---|
| 5,498,925 A | 3/1996 | Bell et al. | 313/497 |
| 5,597,736 A | 1/1997 | Sampsell | 437/2 |
| 5,978,056 A | * 11/1999 | Shintani et al. | 349/137 |
| 5,982,472 A | 11/1999 | Moore | 349/156 |
| 6,051,446 A | 4/2000 | Moore et al. | 438/36 |
| 6,124,912 A | * 9/2000 | Moore | 349/113 |
| 6,344,888 B2 | * 2/2002 | Yasukawa | 349/113 |

* cited by examiner

Primary Examiner—Kenneth Parker
(74) Attorney, Agent, or Firm—George O. Saile; Rosemary L.S. Pike

(57) ABSTRACT

A method of forming an improved liquid-crystal-on-silicon display and resultant display is described, in which the device structure is enhanced by the photolithography building of alignment posts among the mirror pixels of the microdisplay.

6 Claims, 5 Drawing Sheets

DEVICE STRUCTURE THAT COMBINES INSULATING MATERIALS FOR ALIGNMENT POSTS AND OPTICAL INTERFERENCE LAYERS

This is a division of patent application Ser. No. 09/262,910, filing date Mar. 5, 1999, Liquid-Crystal-On-Silicon Display With Photolithographic Alignment Posts And Optical Interference Layers, assigned to the same assignee as the present invention now U.S. Pat. No. 6,498,635.

This is related to patent application Ser. No. 09/262,000 filed Mar. 3, 1999 (CS98-076).

BACKGROUND OF THE INVENTION (1) Field of the Invention

This invention relates to the method of fabrication of alignment posts and optical interference layers directly on silicon wafers with liquid crystal material and to the unique resulting device structure.

(2) Description of the Prior Art

The picture quality of liquid crystal displays from a simple seven segments to millions of pixels is determined by the structure used to control the variation of thickness and position leads after wafer processing. There are known processes for creating insulated alignment posts based on preformed glass microspheres and rods; relatively low series resistance posts can be obtained by means of selective deposition of polysilicon and metallic silicide. (Making of metallic vias and contacts are a comparatively well known processing art.)

U.S. Pat. No. 5,498,925 to Bell et al describes the formation of posts in flat panel displays using processes based on a heat-treated slurry or paste upon a glass plate. U.S. Pat. No. 5,597,736 teaches the function of a light-blocking layer deposited upon a semiconductor substrate material that can emit light. Until now, it has been difficult to construct alignment posts using photolithography and also add optical interference layers simultaneously onto a semiconductor substrate material.

BRIEF SUMMARY OF THE INVENTION

A principal object of the present invention is to describe a new structure for building a flat-panel liquid-crystal display upon an integrated circuit (IC) die with inter-related alignment between the posts supporting the overlaying glass cover plate and optical interference layers (OIL) employed to improve image quality. The alignment posts are made of silicon nitride, and the OIL of silicon nitride/oxide multi-layers.

Another object of this invention is to describe effective and very manufacturable methods of photolithographic formation of insulating alignment posts (also called studs or pillars). These methods can be used in processing many different device types, and are described in this application for liquid crystal display devices as a way of illustrating their embodiment at a pixel density beyond that achievable with preformed micro-glass spheres and rods.

A further object of the present invention is to describe methods of deposition for both the posts and the optical interference layers that are independent of each other and retain their desired feature during deposition of subsequent features.

In accordance with the objects of this invention, a new method of forming insulating material alignment posts associated with active device structures is achieved. A silicon wafer having patterned active device therein and thereon is formed and the insulating material alignment posts are deposited in a pattern over the pattern of the active device structures. Furthermore a device structure that combines insulating materials for alignment posts and optical interference layers associated with an active device structure in a silicon body is achieved. A silicon semiconductor wafer having patterned active device structures and alignment posts is formed and the whole structure is covered with an optical interference layer;

DESCRIPTION OF THE PREFERRED EMBODIMENTS

Figure 1:
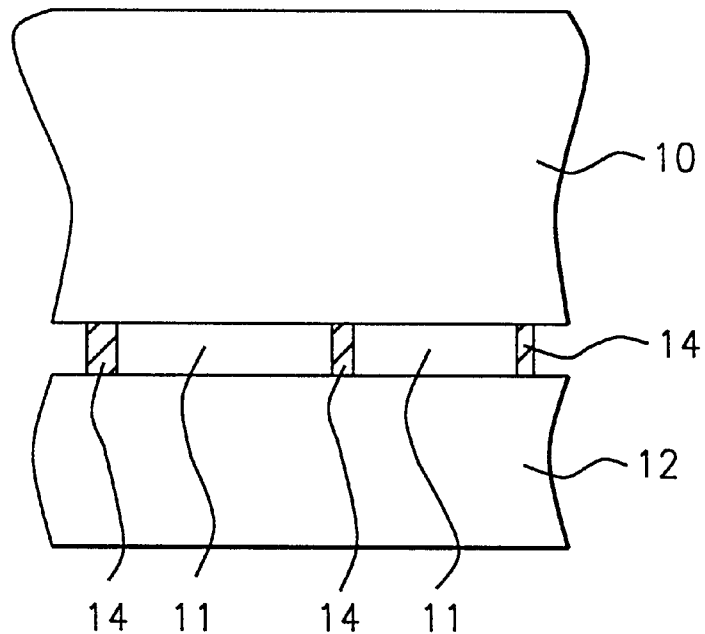
FIGS. 1 through 3 schematically illustrate in cross-sectional representation a preferred embodiment of the device structure of the present invention. The process flow for making the alignment posts and the optical interference layers is shown in FIGS. 4 to 10.

Referring now more particularly to FIG. 1, here is shown a portion of a partially completed integrated circuit liquid-crystal display. The glass cover plate 10 provides the transparent enclosure for the external incident light to be reflected back to an observer. The strength of reflected light is dependent on the light polarization, absorption and light scattering properties of each liquid-crystal display pixel, which is controlled by the electrical field established within the liquid crystal material 11. The IC die 12, separated from the glass plate by the alignment posts 14 generates these E-fields. The resultant space between the glass plate and the silicon wafer is filled with the chosen liquid crystal material. Light, either provided or ambient, enters the open face of the liquid-crystal-on silicon and is reflected from the underlying pixels to form a viewable pattern of polarized light, i.e. the image is viewed directly or projected through an optical polarized system. Such microdisplays may contain more than one-thousand columns by more than one-thousand rows (totally over one-million pixels) in a square surface area less the one inch diagonal; the pixel pitch can be made less than 10 micrometers (microns), and has been achieved as low as 5 microns with an interpixel gap of one micron or less. When alignment posts are placed between adjacent pixels, the interpixel gap has been fabricated at a typical distance of 0.6 microns with a range from 0.55 to 0.85 microns.

The glass cover has a transparent conductive coating on its inner surface, which is the common electrode for the entire pixel array.

Figure 2:
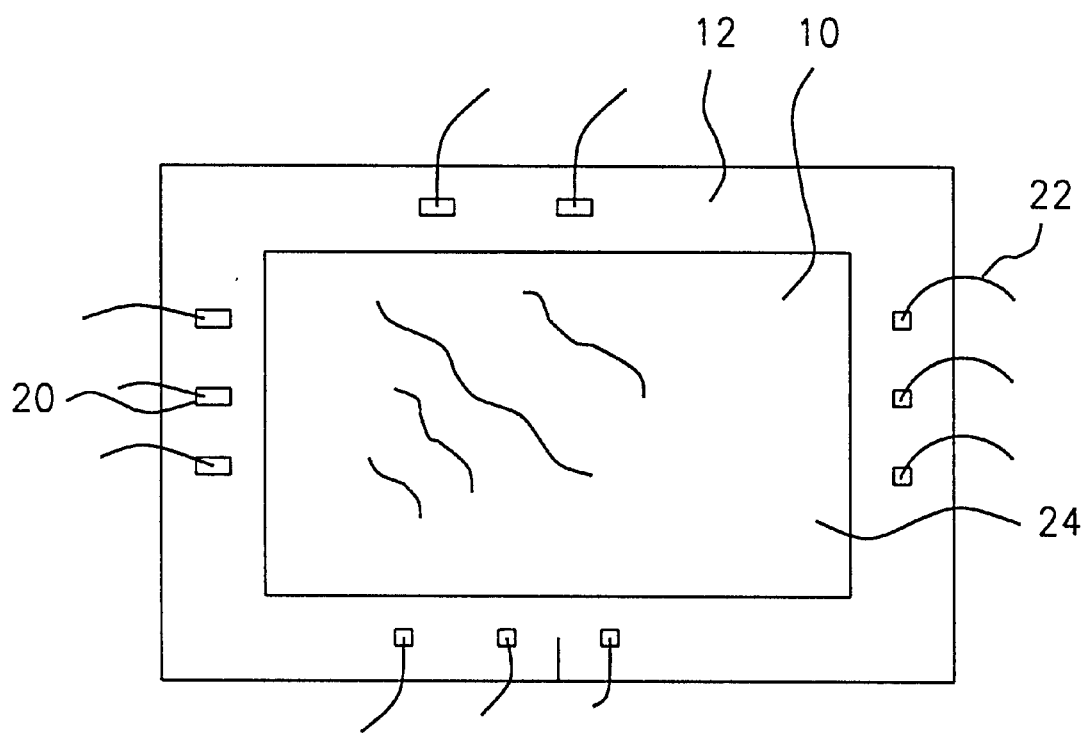
Figure 3:
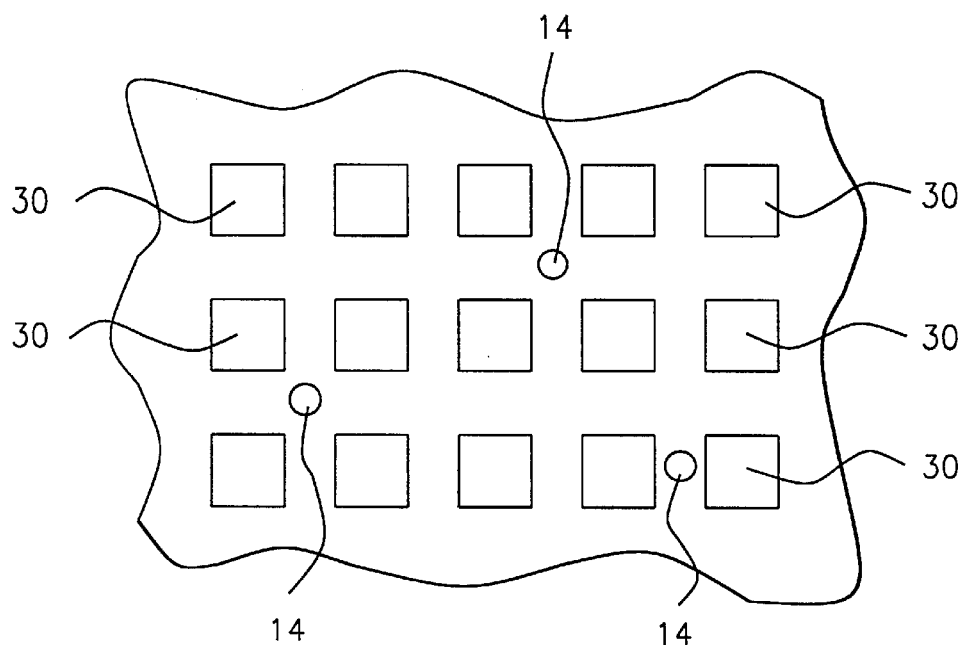

FIG. 2 illustrates the bonding pads 20 on the IC die to which the external wires 22 are attached. The silicon wafer contains the embedded control circuits that activate the pixel patterns in the viewable area 24. The refractive index anisotropy of the liquid crystal is influenced by the electric fields above the IC surface. A small change in voltage makes a large change in the optical transmission. Because this invention teaches the photolithographic making of patterns of alignment posts, the ratio of pixels 30 to posts 14 is often fabricated in the range 20:1 to 50:1. As shown in FIG. 3, the photolithographic method permits these alignment posts to be constructed in the space between adjacent pixels.

The process steps for making the alignment posts and optical interference layers is shown in FIGS. 4 to 10.

Figure 4:
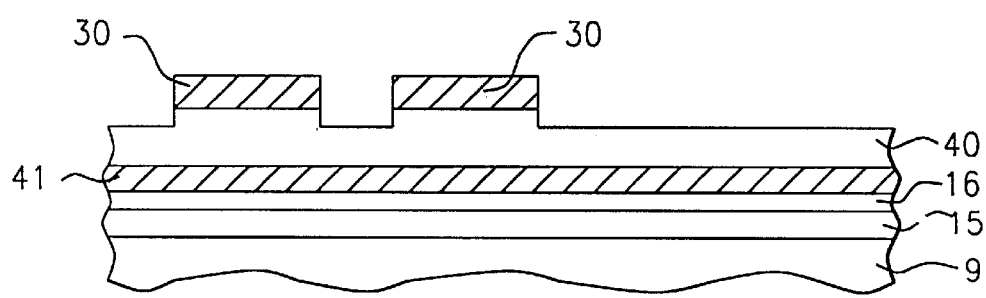
Figure 5:
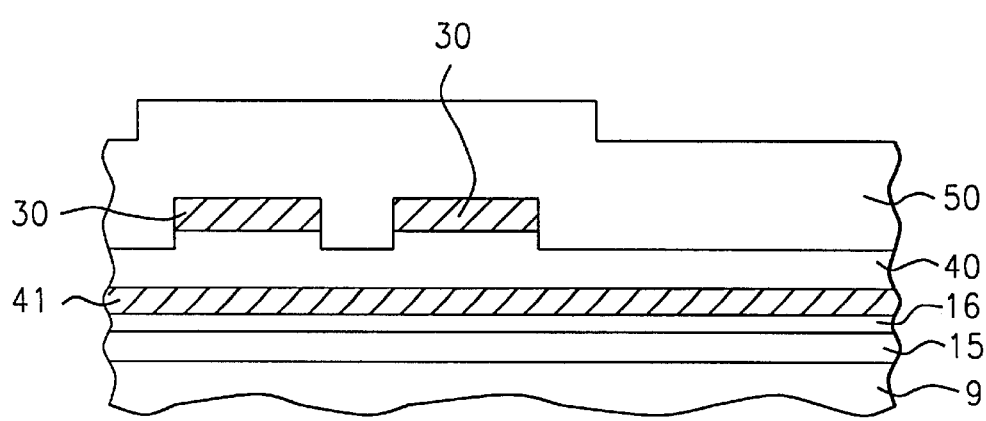
Figure 6:
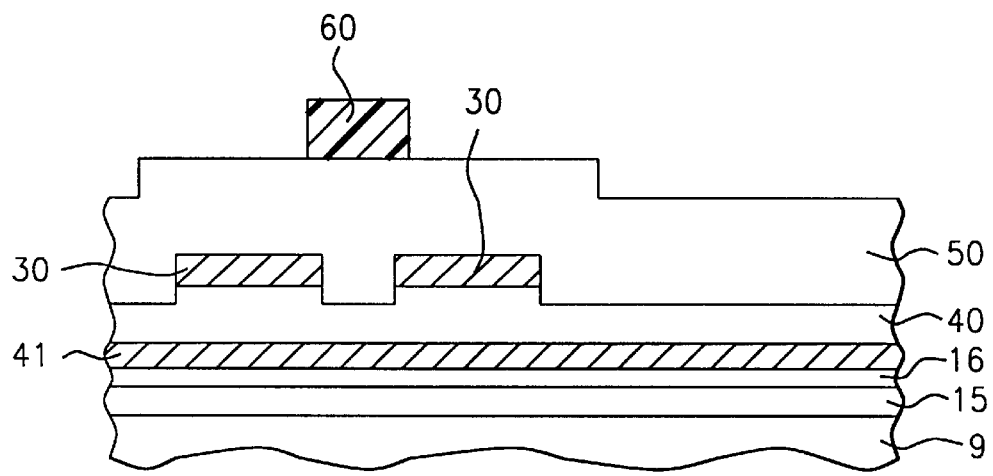

Starting with FIG. 4, the conductive metallic layer 30 is formed over the silicon oxide 40, which is formed on top of the metal layer 41 on the IC. A silicon semiconductor substrate 15 has active devices therein and an insulating layer 16 upon which metal layer 41 is formed. Then a photoresist layer is laid down over the metal 30 to construct the pixels. The photoresist is exposed and a portion removed to provide that each pixel retains a metallic layer, which shall act as a mirror reflector for the light incident upon said pixel. If aluminum were chosen as the metallic mirror, its 90% reflectivity would improve to near 100% with the addition of the overlaid optical interference layer. The remaining photoresist is stripped and the entire structure is covered with silicon nitride 50 by PECVD and to a thickness of between about five-thousand to ten-thousand Angstroms as in FIG. 5. Then the standard photoresist and etching methods are used to create the posts mask 60 shown in FIG. 6. The alignment posts 14 are created by selection of a chemical removal process that stops at the metal 30 and the silicon oxide 40.

Figure 7:
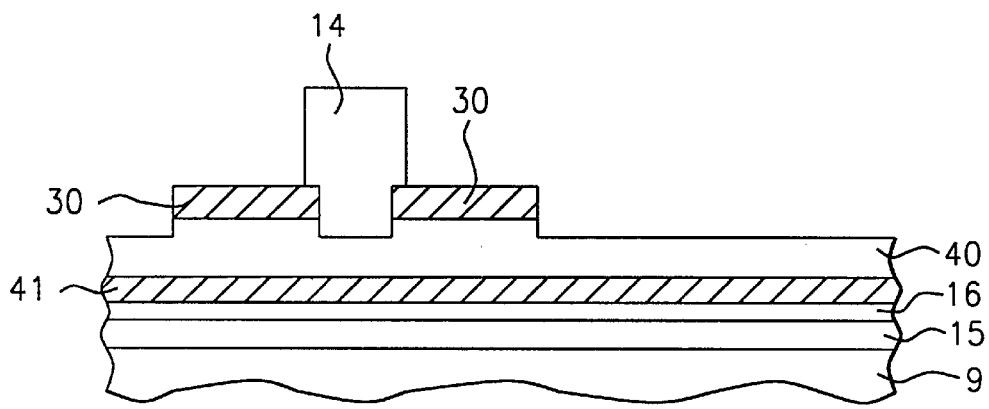

After the resist is stripped, as shown in FIG. 7, the device is ready to be covered with the optical interference layers 80. Optical interference layers are used to improve light reflections. Careful attention is required in constructing these optical interference layers so as not to disturb any underlying devices and posts. The OIL covering is considered to be an optional addition. The added expense of the OIL covering may be avoided in some cases of lower image quality. The LCD-on-silicon device could be completed and used functionally without adding the OIL after the formation of the alignment posts.

Figure 8:
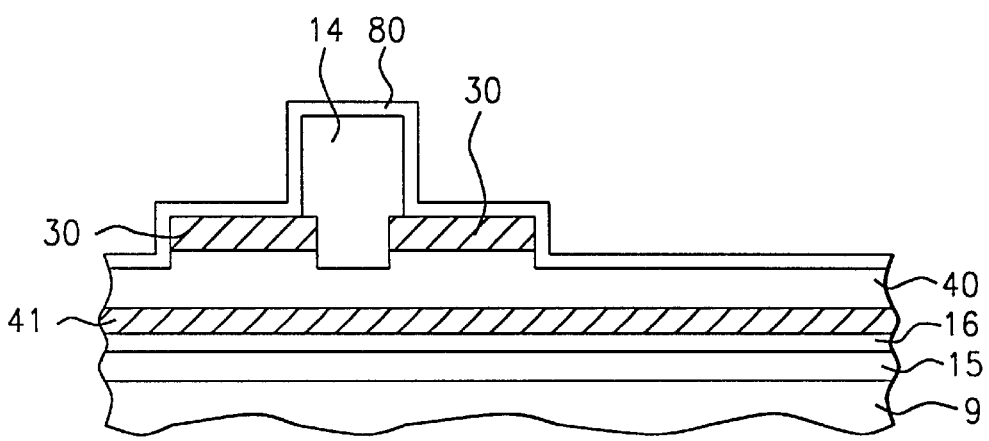
Figure 9:
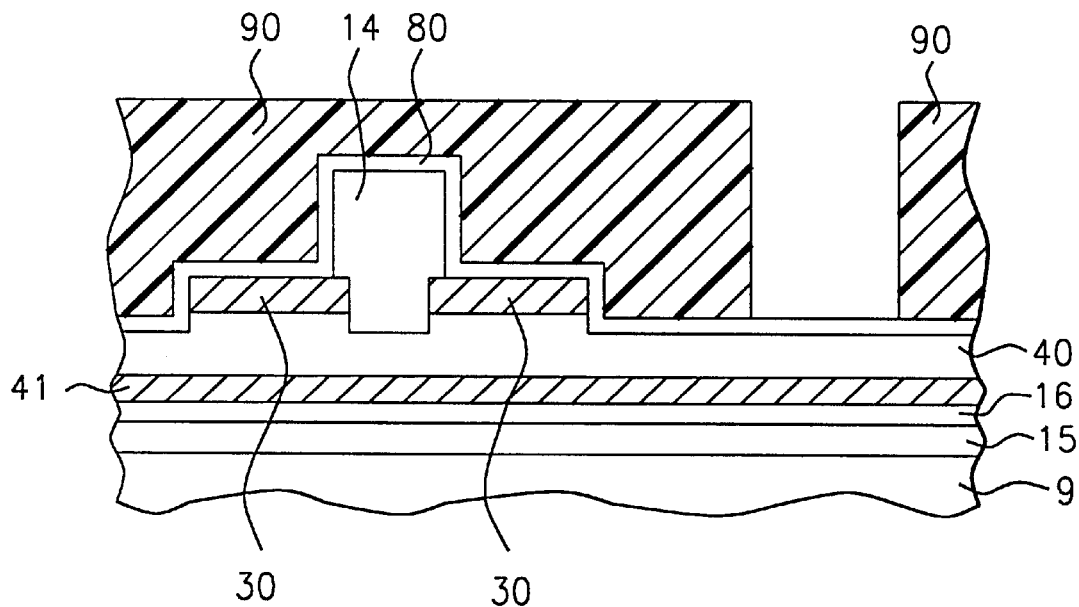
Figure 10:
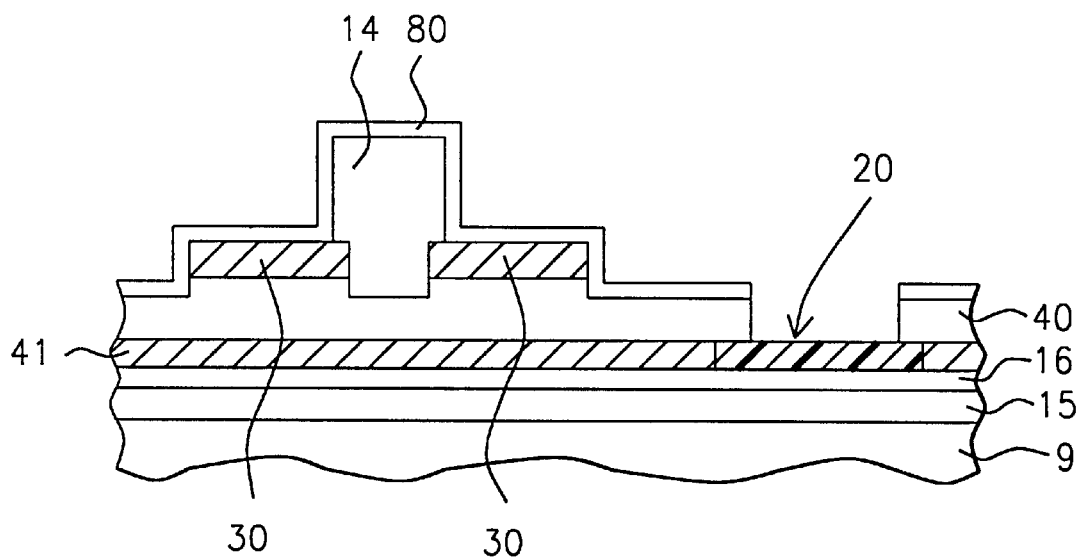
Figure 11:
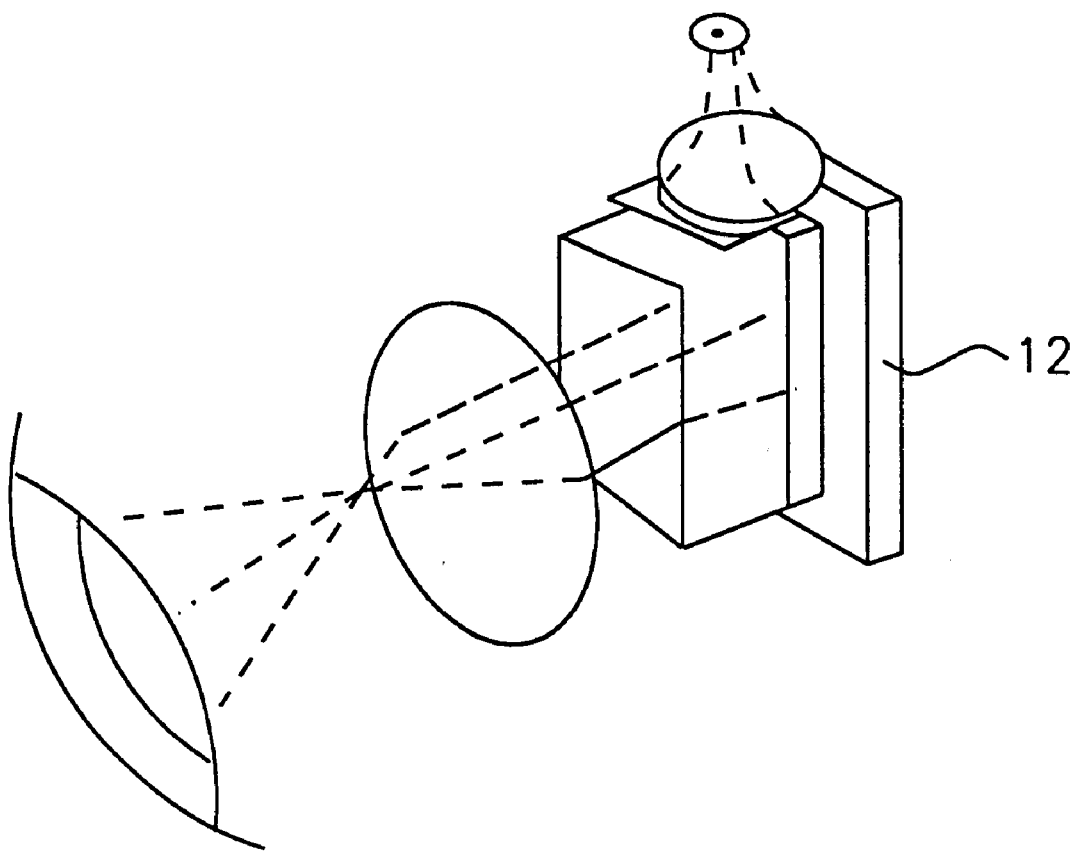
FIG. 11 schematically illustrates in cross-sectional representation the final embodiment of this invention for this liquid-crystal-on-silicon display device. The bonding pad is shown.

The optional optical interference layer coating is composed of multiple layers of insulating material with properties of varying optical indices of refraction, as shown in FIG. 8. Oxides and nitrides have been applied in the fabrication of these multilayer stacks. It is critical to have SiOx as the bottom layer to match the index of refraction of the substrate.

Durable, uniform and reproducible amorphous silicon nitride multilayer coatings deposited by PECVD are known optical interference filters in the near infrared. Optical interference coatings for the visible spectrum made from four or more layers of oxide/nitride/oxide/nitride formed for this application are considered to be novel and worthy for this patent application.

To attach the wires to the IC via bonding pads, a photoresist mask is formed with openings over the location of the bond pads and the material is removed to metallic layer 41. Then the photomask is removed, leaving the finished device structure shown in FIG. 10.

The existence of numerous alignment posts permits the usage of ultra-thin glass plate or cover over the liquid crystal. This implementation results in lightweight displays for portable applications. Glass covers supported by alignment posts are typically 0.5 millimeters in thickness, and can range from 0.2 to 0.8 millimeters.

While the invention has been particularly shown and described with reference to the preferred embodiments thereof, it will be understood by those skilled in the art that various changes in form and details may be made without departing from the spirit and scope of the invention.

What is claimed is:

1. A device structure combining insulating materials for alignment posts of optical interference layers with a pattern of semiconductor devices in or over the surface of a silicon body, comprising:

a silicon semiconductor wafer, said silicon semiconductor wafer having been provided with a pattern of semiconductor devices in or over the surface thereof, said silicon semiconductor wafer further having been provided with a pattern of pixels over the surface thereof, said pixels having a surface comprising a second metallic layer, said second metallic layer having been created over the surface of a layer of silicon oxide;

alignment posts located between said pixels over the surface of said silicon semiconductor wafer, said device structure combining insulating materials for alignment posts with a pattern of semiconductor devices being covered with an optical interference layer;

bonding pads provided over the surface of said silicon body, said bonding pads having been provided with wires attached thereto, said wires being connected to external contacts for control logic and power interconnections;

liquid crystal material located in valleys below peaks of the alignment posts;

a glass cover positioned over and supported by the alignment posts, said glass cover overlying said liquid crystal material, said glass cover not overlying an area not comprising liquid crystal material, bonding pads being located therein or thereover.

2. The device structure of claim 1, wherein said alignment posts comprise silicon nitride.

3. The device structure of claim 1, said alignment posts having a height between about 6,000 and 10,000 Angstroms.

4. The device structure according to claim 1, further comprising an optical interference layer overlying said alignment posts, further overlying said metallic layer and overlying said silicon oxide layer.

5. The device structure of claim 4, said optical interference layer comprising a material selected from the group consisting of silicon oxide and silicon nitride and silicon oxide and silicon nitride.

6. The device structure of claim 4, said optical interference layer providing advantages of:

1) improved pixel field of view for projection optics, and
2) increased pixel direct viewing angle, and
3) improved pixel color contrast ratio, saturation and balance.

* * * * *